(12) United States Patent
Krimmel

(10) Patent No.: US 8,787,409 B2
(45) Date of Patent: Jul. 22, 2014

(54) METHOD FOR DISCONTINUOUSLY TRANSFERRING DATA IN A POINT-TO-MULTIPOINT ACCESS NETWORK, CENTRAL UNIT, AND NETWORK TERMINATION UNIT

(75) Inventor: Heinz-Georg Krimmel, Korntal-Muenchingen (DE)

(73) Assignee: Alcatel Lucent, Boulogne Billancourt (FR)

( * ) Notice: Subject to any disclaimer, the term of this patent is extended or adjusted under 35 U.S.C. 154(b) by 94 days.

(21) Appl. No.: 13/322,181

(22) PCT Filed: May 6, 2010

(86) PCT No.: PCT/EP2010/056167
§ 371 (c)(1),
(2), (4) Date: Nov. 23, 2011

(87) PCT Pub. No.: WO2010/142500
PCT Pub. Date: Dec. 16, 2010

(65) Prior Publication Data
US 2012/0120832 A1      May 17, 2012

(30) Foreign Application Priority Data
Jun. 10, 2009   (EP) ..................................... 09305523

(51) Int. Cl.
*H04J 3/02*     (2006.01)
*H04L 1/00*     (2006.01)
*H04Q 11/00*    (2006.01)

(52) U.S. Cl.
CPC .......... *H04L 1/0041* (2013.01); *H04Q 11/0067* (2013.01); *H04L 2001/0093* (2013.01); *H04Q 11/0071* (2013.01)
USPC ........................................................ 370/537

(58) Field of Classification Search
CPC ..................... H04L 1/0041; H04L 2001/0093; H04L 1/0071; H04Q 11/0067; H04Q 11/0071
See application file for complete search history.

(56) References Cited

U.S. PATENT DOCUMENTS

| 5,144,669 | A | * | 9/1992 | Faulkner et al. | 380/212 |
| 5,473,696 | A | * | 12/1995 | van Breemen et al. | 713/162 |
| 5,550,825 | A | * | 8/1996 | McMullan et al. | 370/486 |
| 5,867,490 | A | * | 2/1999 | Campanella | 370/326 |
| 6,724,727 | B2 | * | 4/2004 | Counterman | 370/235 |
| 6,738,935 | B1 | * | 5/2004 | Kimmitt | 714/701 |
| 7,171,121 | B1 | | 1/2007 | Skarica et al. | |
| 7,209,493 | B2 | * | 4/2007 | Shinoda | 370/510 |
| 7,453,929 | B2 | * | 11/2008 | Barlev et al. | 375/222 |

(Continued)

FOREIGN PATENT DOCUMENTS

WO    02/35906    5/2002

*Primary Examiner* — Min Jung
(74) *Attorney, Agent, or Firm* — Carmen Patti Law Group, LLC

(57) ABSTRACT

An exemplary method and apparatus are provided for transferring data from a central unit in a network to a subscriber-sided network termination unit via a distribution network that connects the central unit with the subscriber-sided network termination unit and multiple of other subscriber-sided network termination units. Measures for providing correct data transmissions, such as scrambling or forward error correction, are applied to the data for the single subscriber-sided network termination unit before the data are combined with data for other subscriber-sided network termination units. As a consequence, there is no longer a need to completely process the transferred data at each and every subscriber-sided network termination unit.

10 Claims, 2 Drawing Sheets

(56) References Cited

U.S. PATENT DOCUMENTS

| | | |
|---|---|---|
| 2005/0135803 A1 | 6/2005 | Lee et al. |
| 2007/0166038 A1* | 7/2007 | Yano .............................. 398/79 |
| 2009/0168812 A1* | 7/2009 | Crookes et al. ............... 370/537 |
| 2010/0074350 A1* | 3/2010 | Malladi et al. ................ 375/260 |
| 2010/0246585 A1* | 9/2010 | Mantri et al. .................. 370/394 |

* cited by examiner

METHOD FOR DISCONTINUOUSLY TRANSFERRING DATA IN A POINT-TO-MULTIPOINT ACCESS NETWORK, CENTRAL UNIT, AND NETWORK TERMINATION UNIT

TECHNICAL FIELD

The invention relates to a method for transferring data in a point-to-multipoint access network from a central unit to a subscriber-sided network termination unit via a distribution network.

BACKGROUND

Point-to-multipoint techniques more and more replace legacy point-to-point techniques in telecommunication, especially in the access area. In the direction versus the end users, the downstream direction, data for the different end users are time division multiplexed (TDM), whereas in the direction starting from the end users, the upstream direction, data from the different end users are combined in time division multiple access technique (TDMA technique). Data transfer originating from and destined for either of the end users thus is a discontinuous data transfer, irrespective of the fact that such data transfer is embedded in a continuous data flow on one and the same medium.

One way of increasing the capacity of such point-to-multipoint access network (also radio connections are considered to be such "network") is to increase the bit rate. Starting in the range of 144 to 155 Mb/s in the 1990s, at the moment we are dealing with upcoming 10 Gb/s. For point-to-point applications even 100 Gb/s at the moment is under development.

A problem is that the energy consumption of the affected apparatus basically is rising with rising bit rate. For different reasons energy consumption should be kept low:
  Equipment sometimes is located remotely and works battery-backed with solar energy.
  During times of power outage a battery-backed operation might be foreseen.
  Waste heat may be disturbing.
  Environmental concerns like carbon footprint more and more play a role.

This problem according to the invention is solved by a method for discontinuously transferring data in a point-to-multipoint access network according to the teaching of claim 1, by a central unit according to the teaching of claim 3, and by a subscriber-sided network termination unit according to the teaching of claim 4.

SUMMARY

The basic idea behind is to on the one hand put out of operation such part of a subscriber-sided network termination unit that is adapted to handle received data intended for the subscriber-sided network termination unit until such data really are foreseen to be received, and on the other hand to take measures that such subscriber-sided network termination unit can operate without prior reception of data foreseen for other subscriber-sided network termination units.

It is to be mentioned that measures for ensuring privacy, namely encrypting and decrypting, necessarily have to be done and are being done individually. In US 2005/135803 A1 as accompanying measure to encrypting and decrypting the use of error correction codes for error recognition is suggested. There, of course, the measures for error recognition necessarily have to be individual as well.

Further embodiments of the invention can be found in the sub-claims and in the accompanying description.

The invention will be described based on an example lying in the field of gigabit passive optical networks with 10 Gb/s or 10 G PON.

DESCRIPTION OF THE DRAWINGS

In the following the invention will be described with the aid of the accompanying drawings.

DETAILED DESCRIPTION

Figure 1:
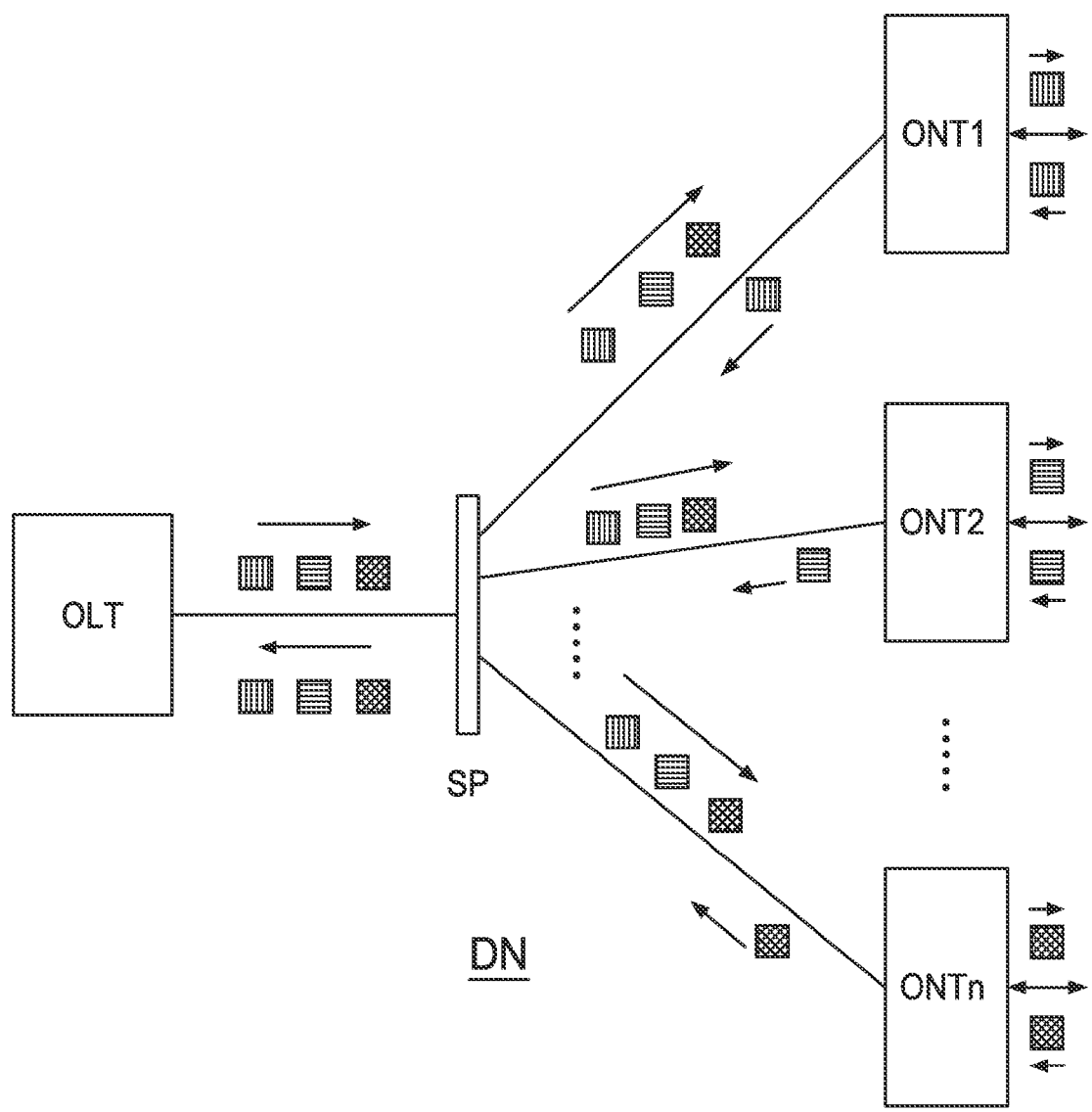
FIG. 1 shows a typical passive optical network, in which the method according to the invention can be applied.

As shown in FIG. 1 a typical passive optical network PON as an example of a point-to-multipoint access network is considered in this invention.

FIG. 1 shows a central unit, here called optical line termination OLT, a distribution network DN, and a multiple of, here three, subscriber-sided network termination units, here called optical network termination units ONT1, ONT2, and ONTn.

The distribution network DN shows a common optical link, not referenced here, reaching from the optical line termination OLT to an optical splitter SP and a multiple of separate optical links, also not referenced here, from the splitter to one of the optical network termination units ONT1, ONT2, and ONTn each. What is referenced here as optical splitter SP normally is a passive optical element that functions as splitter in the downlink direction towards the end users assigned to the optical network termination units ONT1, ONT2, and ONTn, and as a combiner in the uplink direction from the end users towards the optical line termination OLT.

It is to be clearly seen here that each optical network termination unit ONT1, ONT2, and ONTn receives all data destined for all optical network termination units ONT1, ONT2, and ONTn, including the other ones. So actually it has to cope with a continuous data stream though only a discontinuous, bursty data stream is destined for it.

Receiving continuous data streams eases coping with ordinary transmission technological functions like keeping synchronization, error correction or reducing steady components by means of scrambling and is therefore willingly used in legacy applications. Where, as proposed in this invention, such continuous data stream is no longer dealt with continuously, but only in a bursty manner, a remedy for anyway coping with such transmission technological functions has to be foreseen. Of course some transmission technological functions like error correction are not absolutely necessary because they only have to improve but not really enable data transfer, but others like synchronization are basic.

Figure 2:
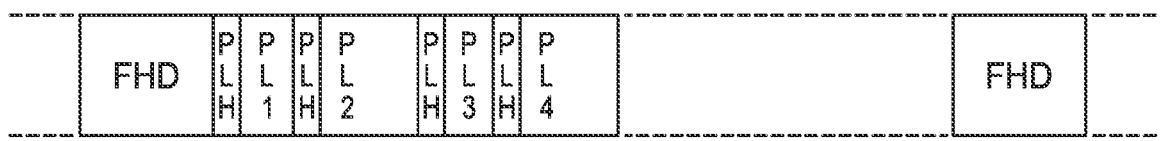
FIG. 2 shows a typical data frame as used in passive optical networks.

FIG. 2 shows a typical data frame as used in passive optical networks.

Such data frames practically are periodical and a frame length of 125 microseconds is widely used in telecommunication. A frame starts with a frame header FHD and is followed by consecutive payload sections each consisting of a payload header PLH and a payload body PLn, here shown the payload bodies PL1, PL2, PL3, and PL4. Whereas the payload headers PLH all have a fixed length and a standardized structure, depending on the used standard or protocol, the payload bodies' contents are free and sometimes, also depending on the used standard or protocol, even the lengths are variable. In the latter case following a frame header FHD a remainder of a payload section started in the previous frame may be completed. Not used capacity normally leads to filler bits or dummy payload sections at the end of a frame. In any event a continuous bit clock is used for synchronization purposes. There is no systematic assignment between payload bodies PLi and optical network termination units ONTk.

Figure 3:
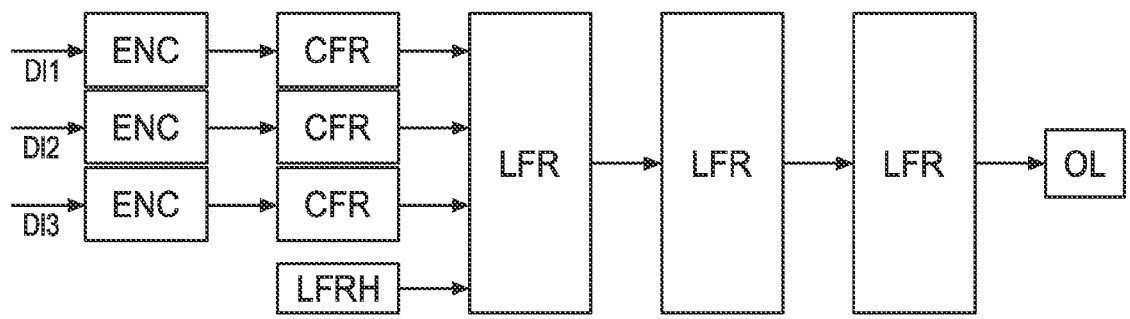
FIG. 3 shows a simplified block diagram of a central unit for such passive optical network according to the state of the art.

FIG. 3 shows the conditioning of data streams like such shown in FIG. 2, as known from the state of the art.

FIG. 3 shows three encoders ENC, three channel framing units CFR, a line framing header unit LFRH, a line framing unit LFR, a scrambler unit SCR, a forward error correction unit FEC, and a box OL representing an optical line.

A multiple of, here three, independent data input streams DI1, DI2, and DI3 pass assigned encoders ENC and channel framing units CFR, before they are forwarded together with the output data of the line framing header unit LFRH to the line framing unit LFR, and from there a multiplexed signal is transferred via the scrambler unit SCR and the forward error correction unit FEC to the optical line OL.

A multiple of, here three, independent data input streams DI1, DI2, and DI3 first is encoded in respective encoders ENC, one per data stream. This ensures privacy, because as already mentioned and as seen in FIG. 1, every optical network termination unit ONT1, ONT2, and ONTn receives all data destined for all destinations.

The independent data input streams DI1, DI2, and DI3 are considered here as representing the contents of one connection or channel each. Such content has to be transferred transparently from this input to a respective output of an assigned optical network termination unit ONT. Normally at the output of such optical network termination unit ONT the terminal of a single subscriber or similar equipment is connected, but principally even a further distribution network could be connected.

Either of the data input streams DI1, DI2, and DI3 might be a continuous or a discontinuous one; and the different data streams might even be out of synchronism with respect to one another. The first step towards multiplexing is the unification and synchronization of the different data streams. At least before multiplexing a common data clock is necessary. For achieving such purposes each of the data input streams DI1, DI2, and DI3 after being encoded undergoes a channel framing in separate channel framing units CFR. Here the data units of the data input streams DI1, DI2, and DI3 are processed each into a payload header PLH and a payload body like PL1, PL2, PL3, or PL4 as already mentioned in the description of FIG. 2.

In most of the known exemplary networks here at the latest the data streams are filled with filler bits or dummy data units to ensure a continuous data stream also for data streams not utilizing the full provided capacity.

Together with frame headers FHD, as shown in FIG. 2, these encoded and framed data input streams are input to the line framing unit LFR, where they are multiplexed, normally in an asynchronous manner, to a common data frame, as shown in FIG. 2. In such networks normally the capacity of the common link is less than the sum of the capacities of the data input streams. So first filler bits or dummy data units coming from the different data input streams are omitted and at the end of a frame either new filler bits or dummy data units are inserted or remainders are forwarded to the next frame.

In order to improve the quality of data transmission various measures are known to be applied in addition to the mere framing. Here two such examples are scrambling and forward error correction. Other kinds of error correction or mere error recognition are other such examples. Such measures imply reversing at the receiving side, here the respective optical network termination unit ONT1, ONT2, to ONTn.

As the latter measures are applied on the framed signal as a whole, their reversing also implies the application on the framed signal as a whole. This hinders the processing of only those signal parts that belong to the data streams intended for reception at the respective optical network termination unit ONT1, ONT2, to ONTn.

To overcome this problem, according to the invention the measures exceeding the combination of data for different optical network termination units ONT1, ONT2, and ONTn are applied to the data of either of the data input streams DI1, DI2, and DI3 and thus are applied before such data are combined with data of the respective other data streams. In the given example this means that scrambling and forward error correction is applied prior to combining the data input streams DI1, DI2, and DI3 to the data stream to be sent towards the optical line OL.

Figure 4:
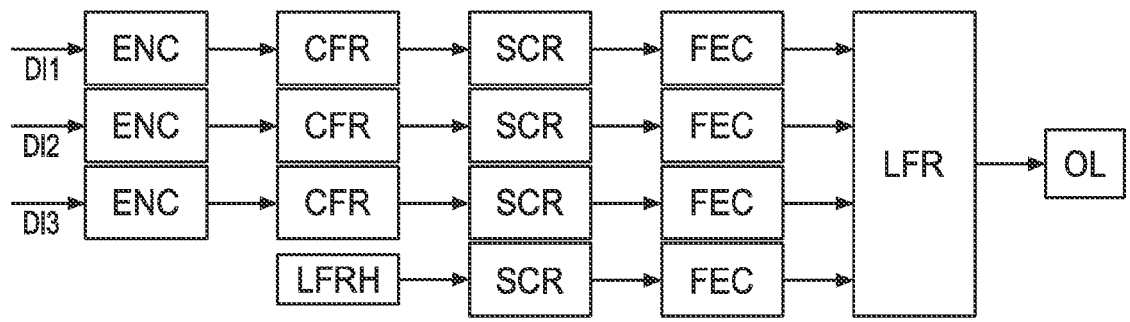
FIG. 4 shows a corresponding block diagram of a central unit according to the invention.

This results in a corresponding block diagram of a central unit as shown in FIG. 4.

FIG. 4 shows three encoders ENC, three channel framing units CFR, a line framing header unit LFRH, four scrambler units SCR, four forward error correction units FEC, a line framing unit LFR, and a box OL representing an optical line.

The functions performed here are principally the same as already described based on FIG. 3 in connection with the prior art description of a central unit as known. The difference is that the measures exceeding the combination of data for different optical network termination units ONT1, ONT2, and ONTn are applied to the data of either of the data input streams DI1, DI2, and DI3 and thus are applied before such data are combined with data of the respective other data streams, as already mentioned. To reversing such measures therefor the other parts of the transferred signal are not needed.

It is to be mentioned here that measures like scrambling or error correction use some kind of coding schemes and normally need blocks of fixed lengths. To ensure this the payloads have to be filled with filler bits to reach such block lengths, if they do not anyway work with fixed blocks. This is considered to be only a minor disadvantage because the additional load is negligible. The use of codes with shorter run lengths could reduce this additional load at the cost of reduced transmission quality, if acceptable.

It is further to be mentioned here that the realization of the different blocks shown in FIGS. 3 and 4 may be achieved by using separate hardware for each and every block, by hardware common to some or all blocks, by software individual to each and every block or by software common to some or all blocks.

As a consequence there is no longer a need to completely process the transferred signal at each and every optical network termination unit ONT1, ONT2, to ONTn.

Figure 5:
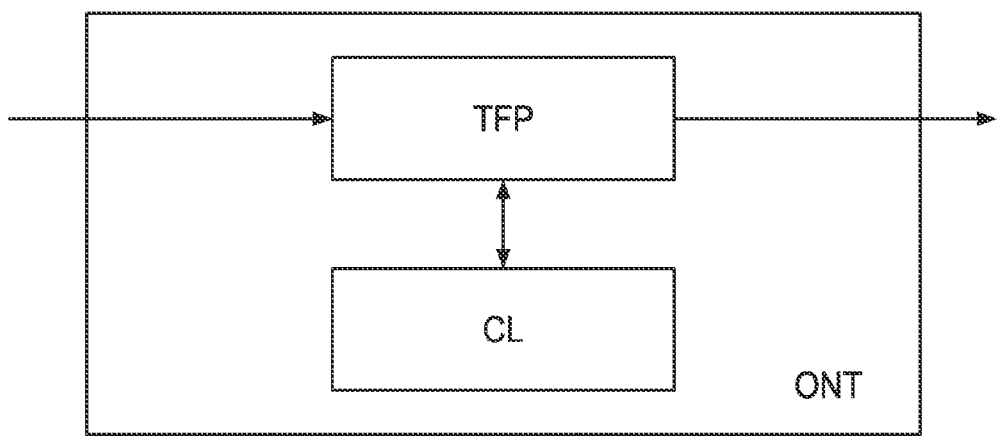
FIG. 5 shows a simplified block diagram of an optical network termination unit as an example of a subscriber-sided network termination unit according to the invention.

As a consequence FIG. 5 shows a simplified block diagram of an example of an optical network termination unit that according to the invention is adapted to not continuously processing an incoming data stream.

FIG. 5 shows an optical network termination unit ONT, that includes a transmission function part TFP and a clock CL.

The transmission function part TFP is adapted to cooperate with the forward error correction unit FEC, the scrambler unit SCR, the channel framing unit CFR, and the encoder ENC processing the data input stream DI1, DI2, or DI3 associated to this optical network termination unit ONT. To this end may be it also needs information from the line framing header unit LFRH. To this end it needs to work only when such data arrive at its input and according to the invention it is adapted to be put out of operation controlled by the clock CL.

The clock CL has to maintain synchronization in times the transmission function part TFP is out of operation, is adapted to put out of operation such part, when applicable, and is adapted to reverse such putting out of operation when data income is expected.

Depending on the protocol and standard used, the times when data income is to be expected, may be fixed while putting such optical network termination unit ONT into operation, when establishing a connection to this optical network termination unit ONT, or may be reported once per frame in the frame header FHD or even in subsequent reports within the different payload headers PLH.

Depending on the way of reporting the transmission times to the optical network termination unit ONT and its clock CL the sleep times of the transmission function part TFP may be longer or shorter and the reduction in energy consumption may be higher or lower. In order to ensure correct operation, a timely wake up for re-synchronization and re-alignment may be necessary. But this is not a principle problem.

Similar putting out of operation of not continuously used parts of an optical network termination unit ONT may be applied to those parts of the unit that apply to data sent in the opposite direction, here the upstream direction.

The invention claimed is:

1. A method for transferring data from a central unit in a network to a subscriber-sided network termination unit via a distribution network that connects the central unit with the subscriber-sided network termination unit and multiple of other subscriber-sided network termination units, comprising:
   encoding individually multiple independent data input streams at the central unit;
   channel framing each of the individually encoded multiple independent data input streams after the encoding at the central unit; and
   performing, on each of the channel framed multiple independent data input streams individually at the central unit, scrambling and forward error correction prior to the combination of the multiple data input streams.

2. The method according to claim 1, wherein the network is a passive optical network.

3. The method according to claim 1, wherein the central unit is an optical line termination.

4. The method according to claim 1, wherein the subscriber-sided network termination is an optical network termination unit.

5. A central unit for a point-to-multipoint access network with the central unit, a distribution network and a multiple of subscriber-sided network termination units, comprising:
   a transmission function means adapted to scramble data and provide forward error correction during a transfer of encoded data; and
   a multiplexer adapted to combine data for a subscriber-sided network termination unit with data for other subscriber-sided network termination units;
   wherein the transmission function means and the multiplexer are arranged in such a consecutive manner that the scrambling and forward error correction of the data for the subscriber-sided network termination unit are carried out prior to data input to the multiplexer.

6. The central unit according to claim 5, wherein the multiplexer is adapted to combine the data for the subscriber-sided network termination unit with the data for the other subscriber-sided network termination units after the data for the subscriber-sided network termination unit has been scrambled and forward error correction encoded and after the data for the other subscriber-sided network termination units has been scrambled and forward error correction encoded.

7. A subscriber-sided network termination unit of a passive optical network, the subscriber-sided network termination unit comprising:
   at least a first part adapted to receive scrambled and encoded data from a central unit, wherein the received data was scrambled and forward error correction encoded at the central unit prior to being multiplexed and transmitted with other signals; and
   at least a second part separate from the at least first part, wherein the at least second part includes a clock adapted to control the operation of the at least first part.

8. The subscriber-sided network termination unit according to claim 7, wherein the first part is adapted to perform such functions that relate to transmission function measures for serving a transfer of data for the subscribe-sided network termination unit, and wherein the functions include the scrambling and the forward error correction encoded.

9. The subscriber-sided network termination unit according to claim 7, wherein the at least first part is adapted to operate only when data arrives at its input.

10. The subscriber-sided network termination unit according to claim 9, wherein the clock is adapted to maintain synchronization when the at least first part does not receive data.

* * * * *